Figure 1:
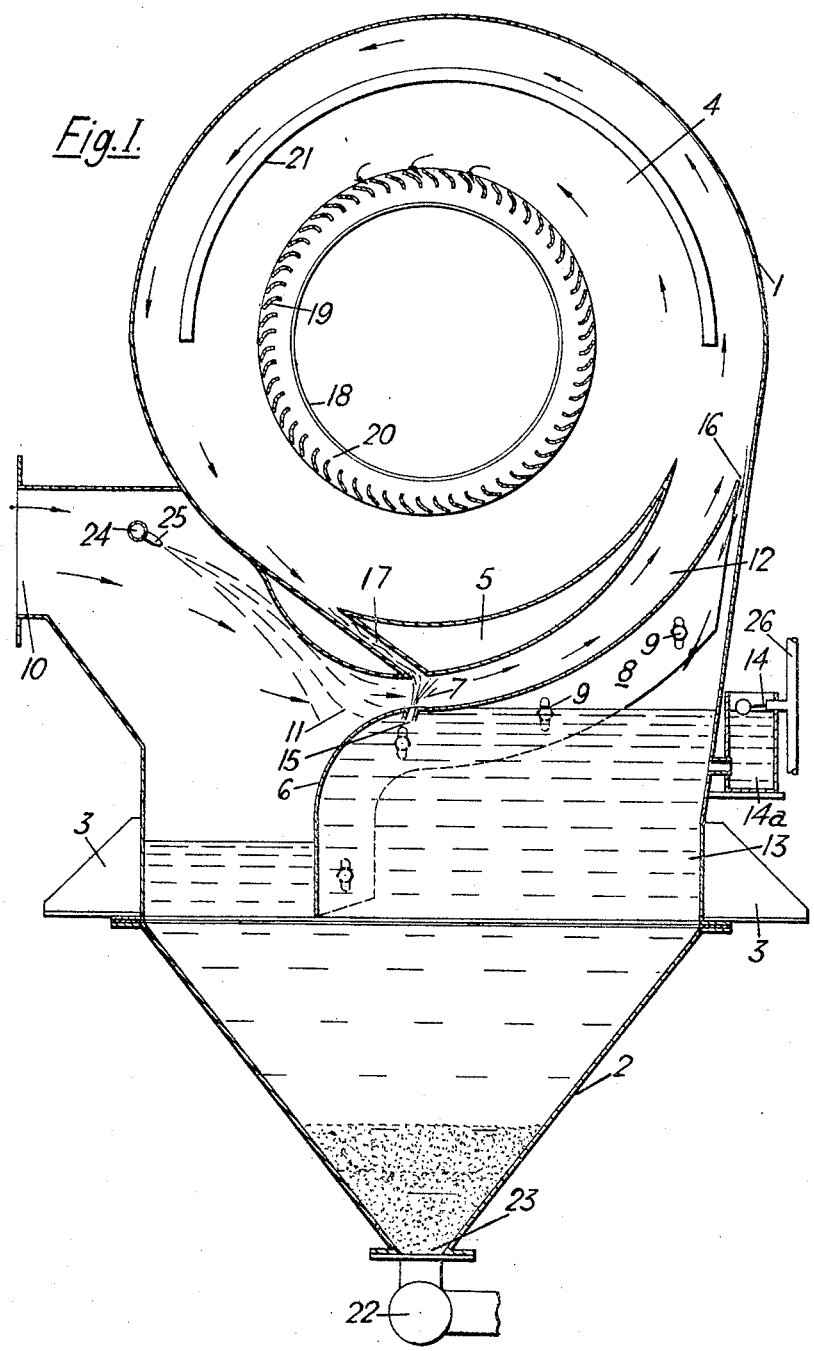

Aug. 9, 1966  G. B. TYLER  3,264,805
GAS SCRUBBERS

Filed Oct. 31, 1963  2 Sheets-Sheet 1

Inventor
GEORGE B. TYLER
By
Holcombe, Wetherill & Brisebois
Attorneys

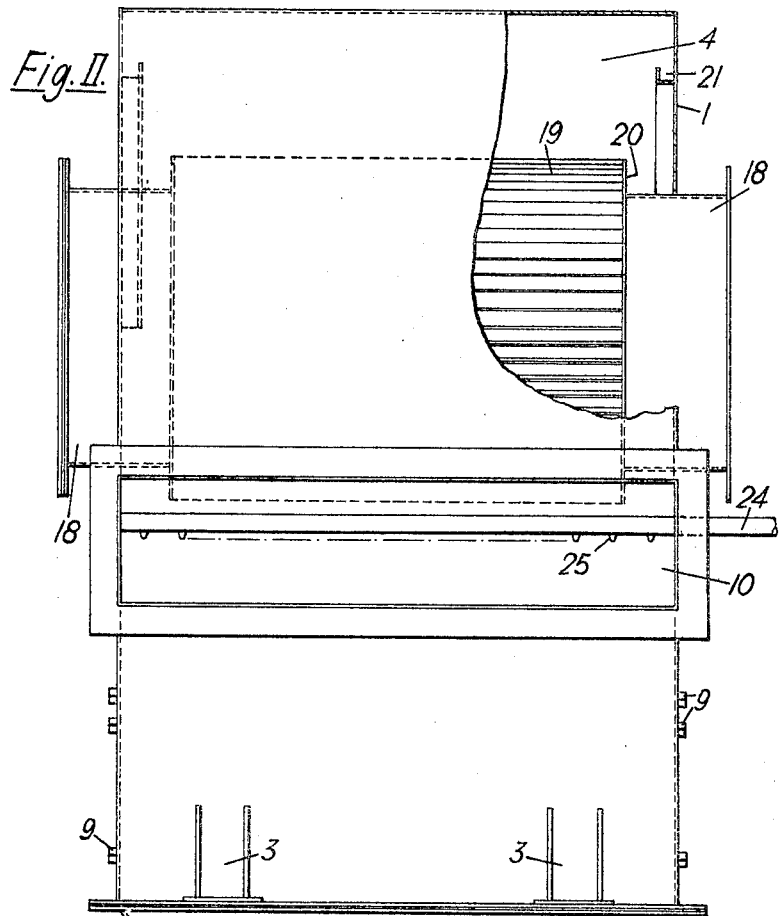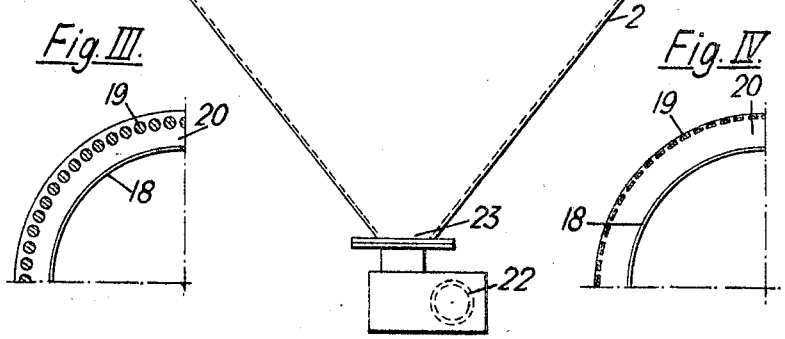

United States Patent Office 3,264,805
Patented August 9, 1966

3,264,805
GAS SCRUBBERS
George Benjamin Tyler, Beaconsfield, England, assignor to Buell Limited, Yorkshire, England, a company of Great Britain
Filed Oct. 31, 1963, Ser. No. 320,324
Claims priority, application Great Britain, Nov. 6, 1962, 41,949/62
6 Claims. (Cl. 55—238)

This invention relates to gas scrubbers for removing dust or other impurities from gases of the kind in which the gas to be scrubbed is passed through a venturi to the throat of which one or more streams of water are supplied. The increase in velocity of the flow of gas through the throat of the venturi and the corresponding reduction in pressure gives rise to conditions which break up the stream or the streams of water into very finely divided sprays which are intimately mixed with the gas stream.

It has been usual in scrubbers of this kind for the venturi to be arranged substantially horizontally and for it to discharge into a separator chamber in which the velocity of flow of the gas is reduced to such an extent that the water with the impurities fall out of it. The cleaned gas flows out of the top of the separator chamber and the water flows from the bottom of the chamber into a settling tank where the insoluble impurities, such as dust, separate from the water and the water is pumped back to the throat of the venturi. With this arrangement the water only passes once through the throat of the venturi and is thus only mixed once with the gas for each time that it passes through the pump. In other words the whole of the energy required to cause the water to circulate through the gas is supplied by the pump from an outside source.

According to this invention, the venturi of a scrubber of the kind described is mounted at or near the bottom of a substantially circular chamber into which the venturi outlet discharges upwards in a circumferential direction so that the gases are caused to flow around the chamber and the water is thrown centrifugally outwards; and a water duct is provided from the bottom of the chamber to the throat of the venturi so that the water is drawn back into the venturi by the reduced pressure at its throat and is then recirculated in the gas stream.

With this arrangement the water is recirculated continuously through the gas by the energy of the gas stream itself. Further, a particularly intimate contact is obtained between the gas stream and the water not only in the venturi but also in the circular chamber around which both the gas and the water flow.

A water reservoir is preferably arranged below the venturi at the bottom of the chamber and a further duct is provided between the throat of the venturi and this reservoir, so that, in use, fresh water is drawn from the reservoir into the venturi through the further duct. Thus, the water which is thrown out of the gas stream in the circular chamber is recirculated to the venturi and also fresh water is drawn from the reservoir into the venturi.

The outlet of the venturi may also be connected to the reservoir through an opening through which excess water which is thrown centrifugally out of the gas stream as it leaves the throat of the venturi is caused to return to the reservoir. This excess water which is not recirculated takes most of the particles of impurity from the gas stream into the reservoir where they settle out as a sludge. The reservoir is provided with an outlet at its bottom from which this sludge is removed. The sludge may be removed continuously by a pump or other means but then some water is inevitably removed with it. To replace the lost water and to maintain the level in the reservoir, water may be supplied through one or more high pressure spray nozzles for directing water in the direction of gas flow into the entry to the venturi. The water particles impinging on the contracting gas stream increases the mixing and turbulence already present at the throat of the venturi, improves the scrubbing action, and reduced the temperature of the gas stream if this is initially rather high.

Preferably, the gas flows from the circular casing through an axial opening at its centre. To destroy the rotational energy of the gas stream and to cause it to flow out through the opening satisfactorily, a series of baffles may be provided around the opening and extending in the axial direction across the casing. These baffles may be in the form of guide blades but various alternatives are possible. Amongst these are a perforated cylindrical plate extending around the opening or a number of circular rods.

One example of a gas scrubber for cleaning dust-laden gas and constructed in accordance with the present invention is illustrated in the accompanying drawings, in which:

FIGURE I is a central vertical section through the scrubber;

FIGURE II is a front elevation of the scrubber with parts of the casing broken away to show the baffles extending around the outlet opening;

FIGURE III is a scrap section through a modified form of baffles; and,

FIGURE IV is a similar scrap section through an alternative modified form of baffles.

The scrubber has a casing provided with a part-cylindrical upper part 1 and a lower hopper-shaped part 2 which is connected by means of a flange joint to downward extension of the part 1. The casing can be mounted in any suitable position by means of four brackets 3. A substantially cylindrical separating chamber 4 is defined by the part 1 of the casing and by a partially double-skinned curved baffle 5 which extends the full width of the part 1 of the casing in the axial direction. Another baffle 6 which similarly extends the full width of the casing defines, with the baffle 5, a venturi having a throat 7. The baffle 6 has a downturned flange 8 at each end which is connected to the adjacent end wall of the casing by a number of bolt and slot connections 9 allowing the height of the baffle 6 and hence the constriction at the throat 7 of the venturi to be varied. An inlet 10 in the front of the scrubber casing is arranged to direct dust-laden gas under pressure into the venturi entrance 11 and a curved venturi outlet 12 leads upwards tangentially into the chamber 4. In use, the lower part of the casing is kept filled with a reservoir 13 of water at a level which is determined by a ball valve 14 in a tank 15 communicating with the reservoir 13. The lower horizontal edge of the baffle 6 extends beneath the surface of the reservoir.

When dust-laden gas is blown under pressure through the inlet 10, the water level of the reservoir 13 on the side of the baffle 6 nearer to the inlet 10 is depressed relatively to the level on the other side of the baffle 6 as shown in FIGURE I. Heavy dust particles entrained in the gas stream are carried by their inertia below the venturi entrance 11 and are deposited on the depressed surface of the reservoir 13. The gas with the rest of the entrained dust particles passes into the throat of the venturi 7 and the resulting pressure reduction causes water from the reservoir 13 to be sucked into the venturi throat through a duct 15 formed by a longitudianl slot in the baffle 6. This water is intimately mixed with the fast moving gas stream and the dust particles in the gas stream tend to stick to the water droplets.

Any excess water in the gas stream as it leaves the venturi through its exit 12 is thrown centrifugally outward against the upwardly curved baffle 6 and is returned to the water reservoir through another duct 16 formed by on opening between the upper edge of the baffle 6 and the casing 1. In practice, the majority of the dust particles in the gas stream are removed from the gas stream by the excess water which is returned to the reservoir through this opening 16. The gas stream with the rest of the water droplets and dust particles entrained in it is constrained by the outer wall of the chamber 4 to follow a circular path. As this happens further water is flung out of the gas stream and this water is led back to a duct 17 formed by a slot between two parts of the baffle 5 and is sucked through the duct 17 back to the throat 7 of the venturi. The water which reaches the throat 7 of the venturi in this way is recirculated again in the gas stream around the gas chamber 4. A particularly good mixing of the dust laden air and water is produced in the throat 7 as a result of the two streams of water entering the throat in opposite directions from the ducts 15 and 17, both transversely to the main direction of flow through the venturi.

At each end of the cylindrical chamber 4 there is a circular opening on the axis of the chamber. A pipe 18 extends a little way into the chamber 4 through each of these openings and forms an outlet for clean gas from the chamber. A number of curved guide blades 19 extend in the axial direction from end to end across the chamber 4 between flanges 20 mounted around the pipes 18. These blades form baffles which destroy the circular energy of the gas before it leaves the chamber 4 through the pipes 18.

Instead of using guide blades, the baffles may be provided by a number of circular rods or a perforated cylindrical plate as suggested in FIGURES III and IV respectively.

The circumferential flow of gas around the chamber 4 not only produces a centrifugal outward flow of water droplets in the gas but it also produces a reverse inward flow at the end of the chamber as is always the case with a circlular fluid flow in a substantially enclosed chamber. In order to prevent this inward flow from carrying water droplets inwards so that they remain in the gas flow and get carried out of the chamber 4 through the outlet pipes 18, an outwardly directed gutter 21 is provided around each end wall of the chamber 4 near its periphery. These gutters intercept water droplets or a film of water flowing inwards along the end walls of the chamber 4 and cause the intercepted water to drop into the bottom of the chamber 4 and to be sucked back to the throat 7 of the venturi through the duct 17.

The particles of dust which gradually collect in the reservoir as a sludge are removed either continuously or intermittently by means of a pump 22 through an opening 23 in the bottom of the hopper-shaped part 2 of the casing.

A water supply tube 24 having a number of high pressure spray nozzles 25 extends across the width of the casing just inside the inlet 10. The nozzles 25 are directed towards the inlet 11 of the venturi and are used for spraying water in the direction of gas flow into the entrance 11 to the venturi for various purposes, such as cooling the dust-laden gas, or for providing additional water for mixing with the gas. As the water from the nozzles 25 impinges on the baffles 5 and 6 at the entrance to the venturi, it is broken up into very fine droplets and extremely intimate mixing with the gas occurs. The supply of water to the tube 24 is normally controlled automatically by the valve 14 in the tank 14a so that any drop in the water level of the reservoir 13 as a result, for example, of the removal of sludge through the opening 23 is automatically compensated. The valve 14 controls the flow of water through a pipe 26 which feeds the tube 24.

In some cases, the amount of water falling to the bottom of the chamber 4 for recirculation through the venturi may be insufficient to keep the duct 17 full. When this happens some gas is sucked into the throat 7 of the venturi through the duct 17 with the water, but this is not disadvantageous. It may indeed increase the turbulence at the throat 7 of the venturi and so improve the mixture of the water with the gas at this place.

The adjustment in the height of the baffle 6 enables different gas flows to be allowed for or an increased mixing action to be produced at the expense of higher resistance and therefore of higher power requirements for blowing the gas through the inlet 10.

I claim:
1. A gas scrubber for removing dust from gases, said scrubber comprising a casing including an upper generally cylindrical wall defining a separation chamber having a horizontal axis and a lower wall defining a reservoir below said chamber adapted to contain a body of water, discharge means positioned axially of said chamber for removal of gas from said chamber therethrough, a venturi inlet passage formed in the lower portion of said cylindrical wall and opening substantially tangentially into said separation chamber, a gas inlet in the wall of said reservoir positioned to admit dust laden gases under pressure into said venturi passage, a water inlet duct formed in the lower wall of said venturi passage at the throat portion thereof and adapted to extend into the body of water in said reservoir whereby water is drawn into the throat of said venturi by the passage of gas therethrough, and a tangential water outlet duct from said separation chamber positioned to discharge directly into said venturi passage at the throat thereof.

2. A scrubber according to claim 1, in which said scrubber is provided with a passage connecting the outlet of the venturi to the reservoir, through which passage excess water thrown centrifugally out of the gas stream as it leaves the throat of the venturi is caused to return to the reservoir.

3. A scrubber according to claim 1 comprising at least one high pressure spray nozzle positioned to direct water into the entry to the venturi in the direction of gas flow.

4. A scrubber according to claim 1 comprising a series of baffles which extend axially across the chamber and encircle said discharge means.

5. A scrubber according to claim 4, in which the baffles are in the form of guide blades.

6. A scrubber according to claim 1 in which said chamber comprises end walls through which said discharge means extends and comprising an inwardly directed gutter on the inner surface of each end wall near its periphery, said gutters being positioned to intercept water flowing inward along said end walls of the chamber and to lead the intercepted water to drop into the bottom of the chamber.

References Cited by the Examiner

UNITED STATES PATENTS

| | | | |
|---|---|---|---|
| 1,866,196 | 7/1932 | Criqui et al. | 55—235 X |
| 2,087,789 | 7/1937 | Allardice | 55—454 X |
| 2,546,673 | 3/1951 | Mattix et al. | 138—45 |
| 2,604,185 | 7/1952 | Johnstone et al. | 261—118 X |
| 2,832,432 | 4/1958 | Fanton | 55—249 |
| 3,131,237 | 4/1964 | Collins | 261—119 X |

FOREIGN PATENTS

| | | |
|---|---|---|
| 472,729 | 10/1937 | Great Britain. |
| 779,589 | 7/1957 | Great Britain. |
| 843,609 | 8/1960 | Great Britain. |

HARRY B. THORNTON, *Primary Examiner.*

D. K. DENENBERG, *Assistant Examiner.*